(12) United States Patent
Matsuno (10) Patent No.: US 10,238,571 B2
(45) Date of Patent: Mar. 26, 2019

(54) VISION-ASSIST DEVICES AND METHODS OF CALIBRATING IMAGE DATA OF A VISION-ASSIST DEVICE

(71) Applicant: Toyota Motor Engineering & Manufacturing North America, Inc., Erlanger, KY (US)

(72) Inventor: Nobuyuki Matsuno, San Jose, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 216 days.

(21) Appl. No.: 15/189,544

(22) Filed: Jun. 22, 2016

(65) Prior Publication Data

US 2017/0367921 A1 Dec. 28, 2017

(51) Int. Cl.
*A61H 3/06* (2006.01)
*G06K 9/62* (2006.01)
(Continued)

(52) U.S. Cl.
CPC .......... *A61H 3/061* (2013.01); *G02B 27/0101* (2013.01); *G02B 27/0172* (2013.01); *G06K 9/3241* (2013.01); *G06K 9/6267* (2013.01); *G06T 3/608* (2013.01); *H04N 5/2628* (2013.01); *A61H 2201/1604* (2013.01); *A61H 2201/165* (2013.01); *A61H 2201/1609* (2013.01);
(Continued)

(58) Field of Classification Search
CPC ............ A61H 3/061; A61H 2201/5058; A61H 2205/024; G06K 9/6267; G06K 9/3241; H04N 5/23258; G06T 7/0018
See application file for complete search history.

(56) References Cited

U.S. PATENT DOCUMENTS 6,278,441 B1   8/2001   Gouzman et al.
6,816,755 B2   11/2004  Habibi et al.
(Continued)

FOREIGN PATENT DOCUMENTS

EP     2065871     3/2009
WO     2010019925  2/2010

OTHER PUBLICATIONS

Molton, et al "A stereo vision-based aid for the visually impaired", Image and Vision Computing, Elsevier, Mar. 4, 1998, vol. 16. No. 4, 13 pages.
(Continued)

*Primary Examiner* — Qian Yang
(74) *Attorney, Agent, or Firm* — Dinsmore & Shohl LLP (57) ABSTRACT

Vision-assist devices and methods are disclosed. In one embodiment, a vision-assist device includes an image sensor for generating image data corresponding to a scene, a processor, and an inertia measuring unit. The inertia measuring unit is configured to measure forces acting on the image sensor and the orientation of the image sensor. The processor is configured to receive the image data from the image sensor and process the force and orientation of the image sensor so as to determine a tilt of the image sensor. The processor is further configured to process the image data based on at least the tilt of the at least one image sensor so as to generate a corrected image data, wherein the corrected image data does not include the tilt.

18 Claims, 7 Drawing Sheets

(51) Int. Cl.
    *G06K 9/32*     (2006.01)
    *G02B 27/01*    (2006.01)
    *G06T 3/60*     (2006.01)
    *H04N 5/262*    (2006.01)

(52) U.S. Cl.
    CPC ............ *A61H 2201/1619* (2013.01); *A61H 2201/5048* (2013.01); *A61H 2201/5058* (2013.01); *A61H 2201/5064* (2013.01); *A61H 2201/5084* (2013.01); *A61H 2201/5092* (2013.01); *A61H 2201/5097* (2013.01); *A61H 2205/024* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 6,842,991 | B2 | 1/2005 | Levi et al. |
| 8,186,581 | B2 | 5/2012 | Kurzweil et al. |
| 8,218,020 | B2 | 7/2012 | Tenchio et al. |
| 8,331,628 | B2 | 12/2012 | Stylianou |
| 8,467,674 | B1 | 6/2013 | Ratner et al. |
| 8,540,155 | B2 | 9/2013 | D'urso |
| 8,606,316 | B2 | 12/2013 | Evamitsky |
| 9,037,400 | B2 | 5/2015 | Tolstedt et al. |
| 9,488,833 | B2 | 11/2016 | Cervantes |
| 9,851,434 | B2 | 12/2017 | Caporizzo |
| 2003/0063776 | A1 | 4/2003 | Sato |
| 2006/0129308 | A1* | 6/2006 | Kates .............. A61H 3/061 701/532 |
| 2007/0016425 | A1 | 1/2007 | Ward |
| 2010/0225773 | A1 | 9/2010 | Lee |
| 2013/0218456 | A1 | 8/2013 | Zelek et al. |
| 2014/0286532 | A1 | 9/2014 | Mizuno |
| 2015/0002808 | A1 | 1/2015 | Rizzo |
| 2015/0211858 | A1 | 7/2015 | Jerauld |
| 2015/0323325 | A1 | 11/2015 | Caporizzo |
| 2016/0098138 | A1* | 4/2016 | Park .............. G06F 3/0416 345/173 |
| 2016/0148434 | A1 | 5/2016 | Blonde |
| 2016/0309143 | A1 | 10/2016 | Fu |
| 2016/0325096 | A1 | 11/2016 | Lui |
| 2017/0003132 | A1 | 1/2017 | Kim |
| 2017/0083084 | A1 | 3/2017 | Tatsuta |
| 2017/0330332 | A1* | 11/2017 | Choi .............. G06T 7/215 |
| 2017/0037291 | A1 | 12/2017 | Doganis |
| 2017/0372491 | A1 | 12/2017 | Caporizzo |

OTHER PUBLICATIONS

Tsai R., "A versatile camera calibration technique for high-accuracy 3d machine vision metrology using off-the-shelf TV cameras and Lenses" IEEE Journal on Robotics and Automation, Aug. 1, 1987, vol. 3, No. 4, 22 pages.

Kim et al., "Computer vision assisted semi-automatic virtual reality calibration" Robotics and Automation 1997 Proceedings, 1997 IEEE International Conference on Albuquerque, NM, USA, Apr. 20, 1997 vol. 2, 6 pages.

Extended European Search Report issued in European Patent Application No. 17180385.1, dated Nov. 2, 2017, 9 pages.

\* cited by examiner

VISION-ASSIST DEVICES AND METHODS OF CALIBRATING IMAGE DATA OF A VISION-ASSIST DEVICE

TECHNICAL FIELD

The present specification generally relates to vision-assist devices, and more particularly, to vision-assist devices that may perform object recognition even when the camera is tilted.

BACKGROUND

Blind or visually impaired persons have difficulty navigating within their environment because of their inability to detect the location and type of objects within the environment. Blind or visually impaired persons often use a cane to assist them in navigating a space. Computer-based vision systems including one or more an image sensors may be used to assist visually-impaired or a blind person. However, image data taken by one or more image sensors may be tiled when the vision-assist device and one or more image sensors are not oriented properly. For example, the image data may be tilted when the image sensor is carried or worn by a user as a result of walking, running, coming to a sudden stop, or due to differences of the user's body type. Although computer-based vision systems are able to detect objects present within image data, object detection may be inaccurate where the image data is tilted.

Devices may utilize servo motors to correct the orientation of the one or more image sensors so as to provide data image in a proper orientation. However, the use of servo motors to physically adjust the angle of the one or more image sensors adds component costs, takes time to adjust the position of the one or image sensors. Thus, use of one or more servo motors may not be suitable for real time and instant object detection.

Accordingly, a need exists for vision-assist devices for blind or visually impaired persons configured to provide the image in a predetermined orientation so as to expedite object detection and facilitate accurate object detection.

SUMMARY

In one embodiment, a vision-assist device includes at least one image sensor for generating image data corresponding to a scene, a processor, and an inertia measuring unit. The inertia measuring unit is configured to detect the angle of the image sensors. The processor is programmed to receive detected angle of the image sensors and process the image data from the at least one image sensor along with the detected angle so as to orient the image data in a predetermined orientation. The processor is further configured to perform object recognition on the oriented image data to determine a classification of a detected object that is present within the scene.

In one embodiment the processor is further configured to determine a confidence value with respect to the classification of the detected object. The confidence value is based on a confidence that the classification of the detected object matches an actual classification of the detected object. The processor is further programmed to generate an auditory signal based on the confidence value. The audio device receives the auditory signal from the processor and produces an auditory message from the auditory signal. The auditory message is indicative of the classification of the detected object and the confidence value.

In another embodiment, a method of calibrating a vision-assist device includes detecting, using the inertia measurement unit, orientation of the image sensor, processing, using the processor, the orientation of the image sensor of the at least one signal to determine a tilt of image sensor, processing, using the processor, the image data to remove the tilt from the image data so as to generate a corrected image data that does not include the tilt, receiving image data of a scene from at least one image sensor, determining, by an inertia measuring unit, the angle of the at least one image sensor, orienting the image data so as to offset the determined angle, and determining, by a processor, from the corrected image data, a classification of a detected object that is present within the scene. These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Referring generally to the figures, embodiments of the present disclosure are directed to vision-assist devices for assisting blind or visually impaired individuals to navigate their environment. Generally, embodiments described herein may be configured as devices that capture image data of the user's environment using one or more image sensors (e.g., one or more cameras), and detect the angle of the image sensors. The detected angle is processed by a processor so as to correct the orientation of the image data. The corrected image data is then processed by the processor to perform object recognition analysis to detect objects or people within the user's environment. Such information may be useful to the blind or visually impaired individual as he or she navigates the environment. As such, processing the image data in a corrected orientation increases the accuracy of object detection.

As a non-limiting example, the vision-assist device may be worn by the user. The image sensor of the vision-assist device may be tilted by improper positioning of the vision-assist device on the user, a sudden stop, as a result of the user being bumped into by someone or some object, and/or differences of the user's body type. As used herein, the term "tilt" means a change in the physical orientation of an object with respect to a predetermined position. An inertia measuring unit detects the tilt of the image sensor (the angular difference between a predetermined position and the resulting position of the image sensor as a result of the sudden stop or being bumped into). A processor processes the image data captured by the image sensor and the detected tilt so as to correct the image data. As used herein, the term "correct" means to adjust the image data to an orientation which is commensurate with image data taken by an image sensor in the predetermined position. Accordingly, object detection is performed with greater accuracy relative to an image data that is skewed.

Various embodiments of vision-assist devices and methods of calibrating image data of a vision-assist device are described in detail herein.

Figure 1:
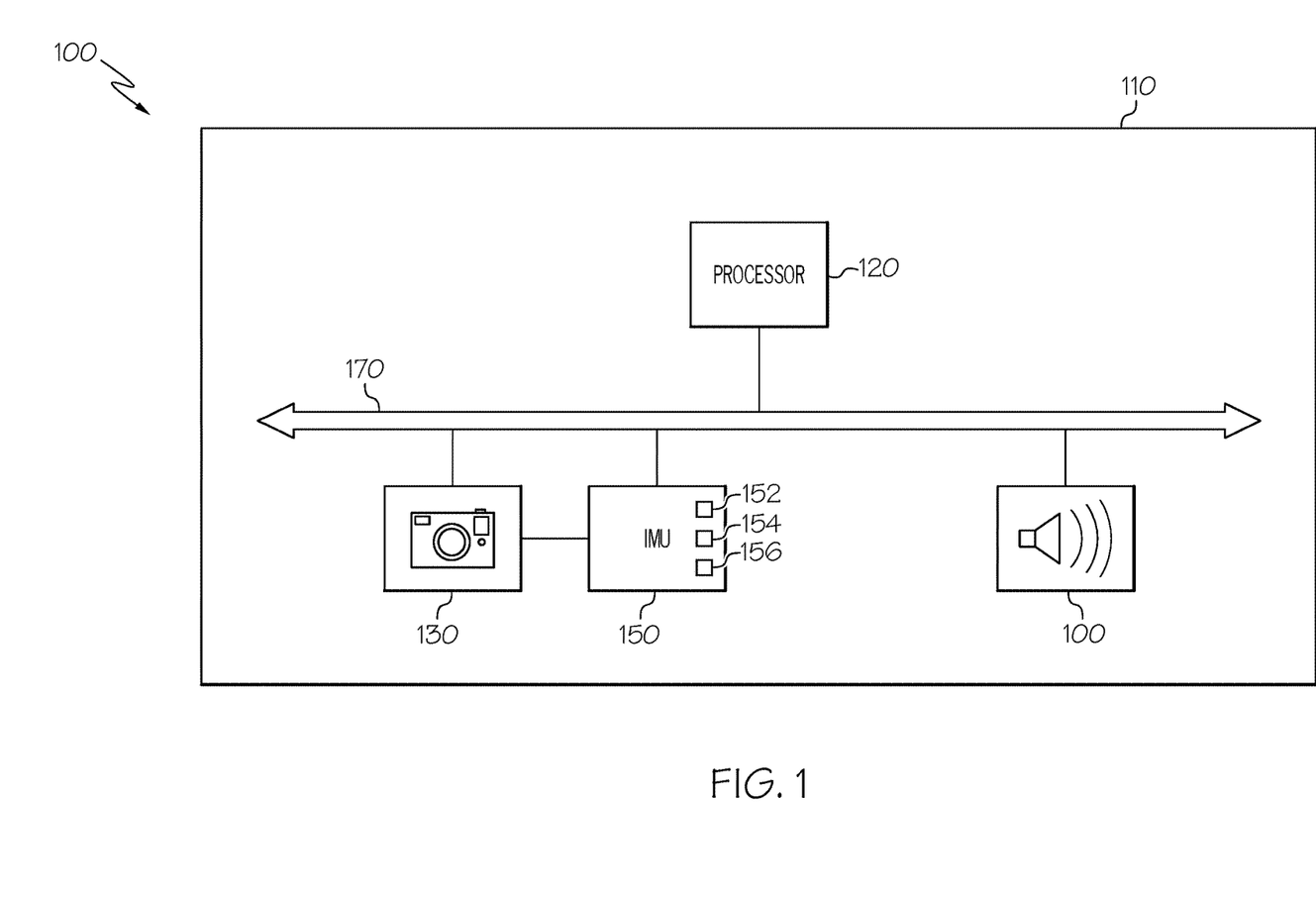
FIG. 1 schematically depicts an example vision-assist device according to one or more embodiments described and illustrated herein.

Referring now to FIG. 1, a vision-assist device 100 is schematically depicted. The vision-assist device comprises a housing 110 in or on which internal components are disposed, such as one or more processors 120, one or more image sensors 130, one or more memory components 140 storing computer-readable instructions, an inertia measuring unit 150 and one or more auditory devices 160. As described in more detail below, the housing 110 may take on any configuration that may be configured to be worn by the user, thereby freeing the user's hands as he or she operates the vision-assist device 100.

The memory component 140 may be configured as volatile and/or nonvolatile non-transitory computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 140 may be configured to store, among other things, operation logic, object recognition logic, and auditory message generation logic, as described in more detail below. The memory component 140 may also store data, such as image data captured by the one or more image sensors or externally acquired image data, for performing the image processing and object recognition analysis described herein below.

A local interface 170 is also included in FIG. 1 and may be implemented as a bus or other interface to facilitate communication among the components of the vision-assist device 100. Although not depicted in FIG. 1, the vision-assist device may also include one or more network interface modules, to connect the vision-assist device to a remote computing device or a remote computer network. The network interface module may include any wired or wireless networking hardware, such as a modem, LAN port, wireless fidelity (Wi-Fi) card, WiMax card, mobile communications hardware, and/or other hardware for communicating with other networks and/or devices.

The one or more processors 120 may include any processing component configured to receive information and execute instructions (such as from the memory component 140 or the inertia measuring unit 150).

The one or more image sensors 130 are configured to capture image data of the environment (i.e., scene) in which the vision-assist device 100 operates. The image data digitally represents the scene in which the vision-assist device 100 operates, such as objects and people within the scene. The image sensor 130 may be configured as any sensor operable to capture image data, such as, without limitation, a charged-coupled device image sensors or complementary metal-oxide-semiconductor sensors capable of detecting optical radiation having wavelengths in the visual spectrum, for example. The one or more image sensors 130 may be configured to detect optical radiation in wavelengths outside of the visual spectrum, such as wavelengths within the infrared spectrum. In some embodiments, two image sensors 130 are provided to create stereo image data capable of capturing depth information.

The one or more auditory devices 160 may be configured as speakers capable of receiving auditory signals from the processor 110 (either directly or indirectly from other hardware, such as amplifiers, drivers, digital-to-analog converts, and the like) to produce auditory message capable of being heard by the user. In some embodiments, the one or more auditory devices 160 include a first speaker and a second speaker so that the auditory message is provided to the user in stereo.

It should be understood that the vision-assist device 100 may include additional components not illustrated in FIG. 1, such as a power source, voltage regulators, analog-to-digital converters, digital-to-analog converters, drivers, signal conditioning circuits, electromagnetic filtering circuits, and the like.

Figure 2:
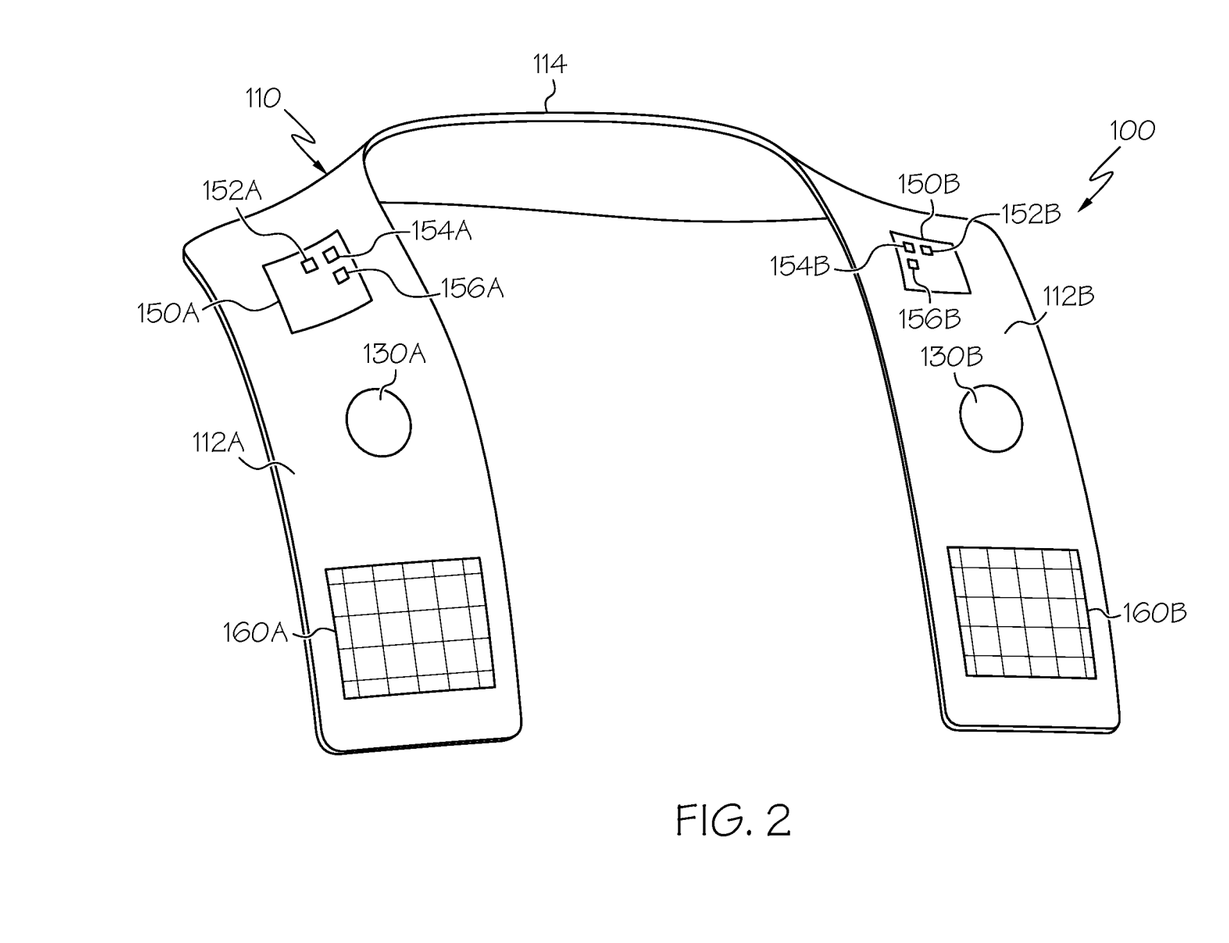
FIG. 2 schematically depicts an example vision-assist device configured to be worn around the neck of a user according to one or more embodiments described and illustrated herein.
Figure 3:
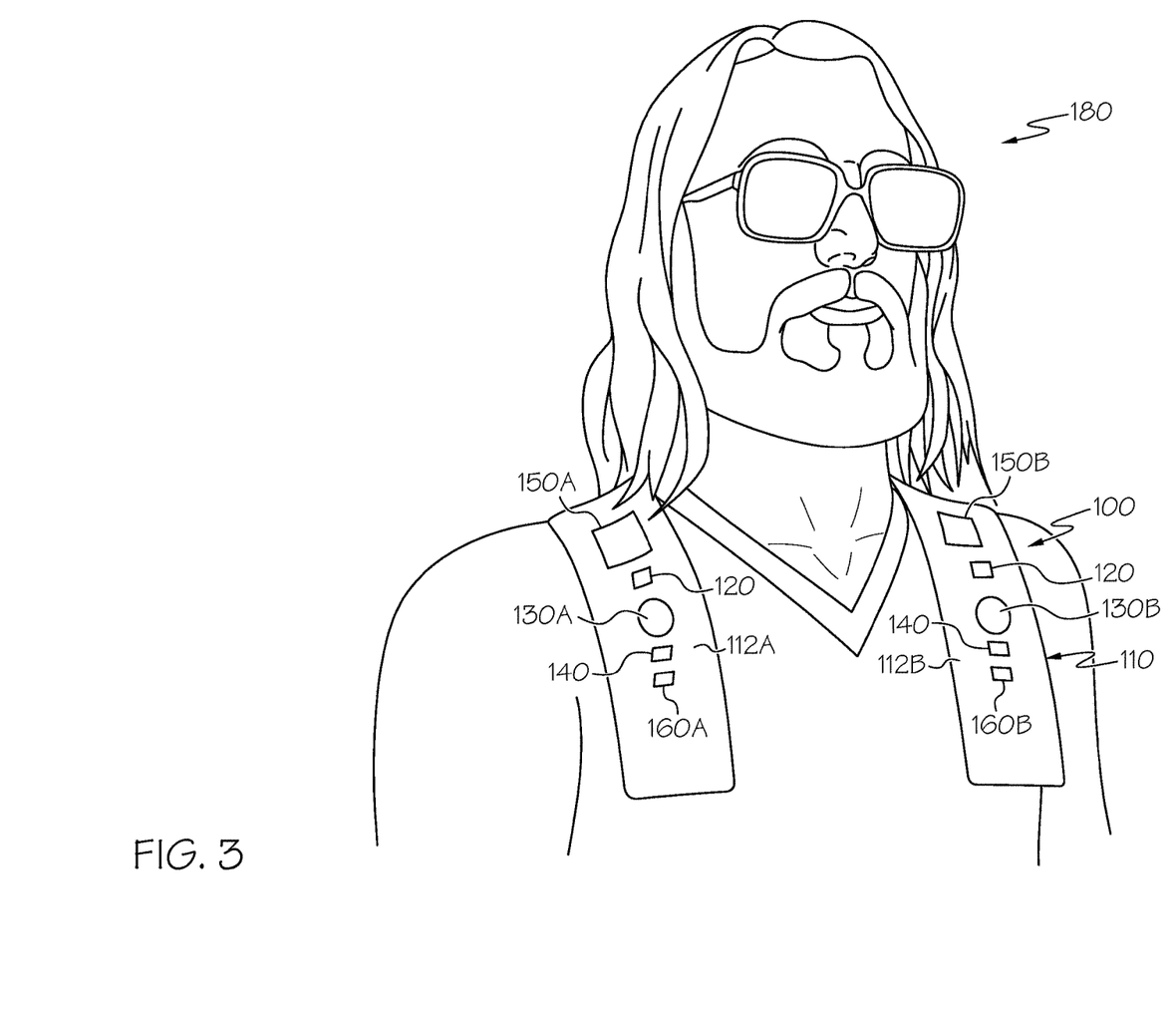
FIG. 3 schematically depicts the example vision-assist device of FIG. 2 as worn by a user according to one or more embodiments described and illustrated herein.

Referring now to FIGS. 2 and 3, a non-limiting, example vision assist device 100 is schematically illustrated. FIG. 2 illustrates the example vision-assist device 100 without a user, while FIG. 3 illustrates the example vision-assist device of FIG. 2 worn by a user 180. Referring generally to both FIGS. 2 and 3, the example vision-assist device 100 has a necklace configuration intended to be worn around the neck of the user 180. The housing 110 of the vision-assist device defines a neck portion 114, a first chest portion 114A, and a second chest portion 114 B. It should be understood that the housing 110 may be configured differently than what is illustrated in FIGS. 2 and 3, and that the housing 110 may take on different shapes and sizes in other embodiments.

In some embodiments, the housing 110 is made from a pliable material, such as, without limitation, ethylene-vinyl acetate. In other embodiments, the housing 110 is made from a rigid material.

Referring specifically to FIG. 3, the vision-assist device 100 is configured to be worn around the neck of the user 180 such that the neck portion 112 contacts, or is in close proximity to, the back of the user's neck. The first and second chest portions 114A, 114B are draped over the user's chest. In the illustrated example of FIGS. 2 and 3, the first chest portion 114A includes a first inertia measuring unit 150A and a first image sensor 130A.

Similarly, the second chest portion 114B includes a second image sensor 130B and a second inertia measuring unit 150B. It should be understood that the arrangement of the various components within the housing 110 of the example vision-assist device 100 depicted in FIGS. 2 and 3 are for illustrative purposes only, and that more or fewer components may be provided, or arranged in a manner that is different from the arrangement depicted in FIGS. 2 and 3. As a non-limiting, alternative arrangement, only one of the first or second chest portions 114A, 114B may include an image sensor and an inertia measuring unit.

The first and second image sensors 130A, 130B are configured to capture image data to produce three-dimensional images of the scene as the user navigates the environment that are used by the object recognition algorithm(s) to detect objects and people, as described in detail below. As shown in FIG. 3, the first and second image sensors 130A, 130B are disposed with the first and second chest portions 114A, 114B such that they are forward-facing and capture image data of the scene directly in front of the user. In other embodiments, one or more additional image sensors may be disposed within the housing to provide image data in directions other than in front of the user 180, such as to the right, left and/or rear of the user.

The inertia measuring unit 150 is configured to detect the displacement the image sensor 130. The processor 120 processes the displacement detected by the inertia measuring unit 150 so as to determine a tilt of respective first and second image sensors 130A, 130B. In one embodiment of the inertia measuring unit 150, the inertia measuring unit 150 includes an accelerometer 152 and a gyroscope 154.

The accelerometer 152 may be configured to measure proper acceleration. As used herein, the term "proper acceleration" is a physical acceleration experienced by the object. Thus, an accelerometer measuring the acceleration of an object resting on the surface of the earth as 9.81 m/s$^2$. Any accelerometer 152 currently known or used, or later developed may be adaptable for use herein, illustratively including a triple axis accelerometer commonly referenced as ADXL345.

The gyroscope 154 is configured to measure the rotational orientation of an object. The gyroscope 154 may be further configured to measure the rotational orientation of an object in three dimensions. Any gyroscope 154 currently known or used, or later developed may be adaptable for use herein, illustratively including three axis digital sensor module commonly referenced as L3G4200D.

In another embodiment of the inertia measuring unit 150, the inertia measuring unit 150 may further include a magnetometer 156. The magnetometer 156 may be configured to measure the magnetic strength and direction of the magnetic field at a point in space. Any magnetometer 156 currently known or used, or later developed may be adaptable for use herein, illustratively including a triple axis accelerometer commonly referenced as HMC588L.

Figure 4:
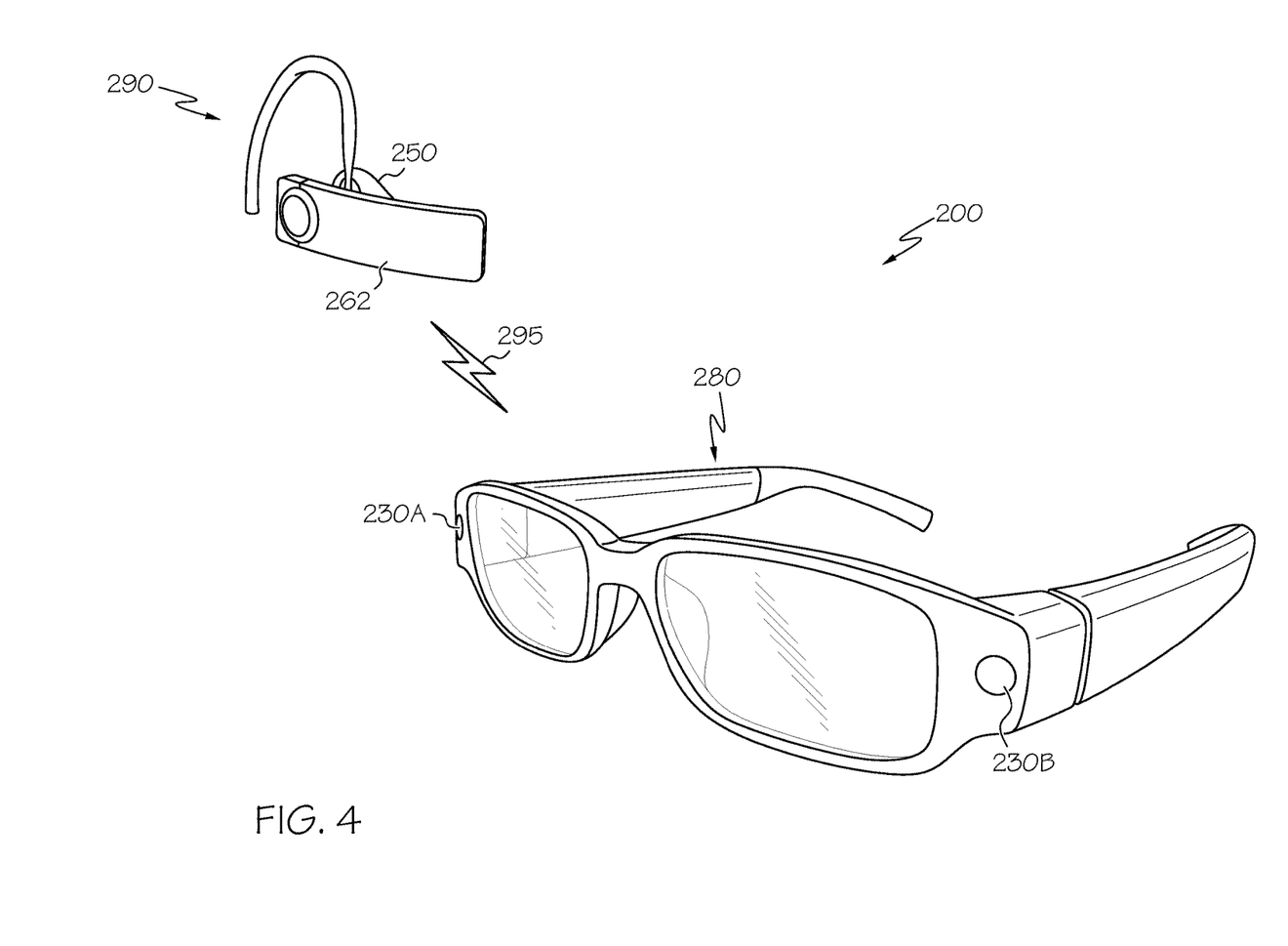
FIG. 4 schematically depicts an example vision-assist device configured as eyeglasses according to one or more embodiments described and illustrated herein.

Referring now to FIG. 4, an example vision-assist device 200 configured as eyeglasses is schematically illustrated. In this example, a housing 280 is configured as an eyeglass frame operable to be worn by the user. First and second forward-facing image sensor devices 230A, 230B are disposed on or within respective ends of the housing 280. As stated above, the image sensor devices 230A, 230B are configured as any device capable of capturing image data of a scene. The inertia measuring unit 150 (not shown in FIG. 4) is disposed within the housing 280. As the first and second forward-facing image sensor devices 230A, 230B are in a fixed position relative to each other, data collected by the inertia measuring unit 150 may be processed by the processor (not shown) to determine the tilt of the first and second forward-facing image sensor devices 230A, 230B. Other hardware (not shown) may be disposed within the housing 280.

The illustrated vision-assist device 200 further includes an earpiece 290 configured to be worn around the ear of a user. The earpiece includes an audio device 260 that is inserted into the user's ear and produces the auditory messages described herein. The example earpiece 290 further includes a microphone 262 as a user input device for inputting information into the vision-assist device 200 (i.e., voice controls). Accordingly, the earpiece 290 acts as an input/output device for the vision-assist device 200. As shown by symbol 295, the earpiece 290 may be in wireless communication with the components (e.g., the processor) within the housing 280. In other embodiments, the earpiece 290 is integrated into the eyeglass frame housing 280.

Figure 5:
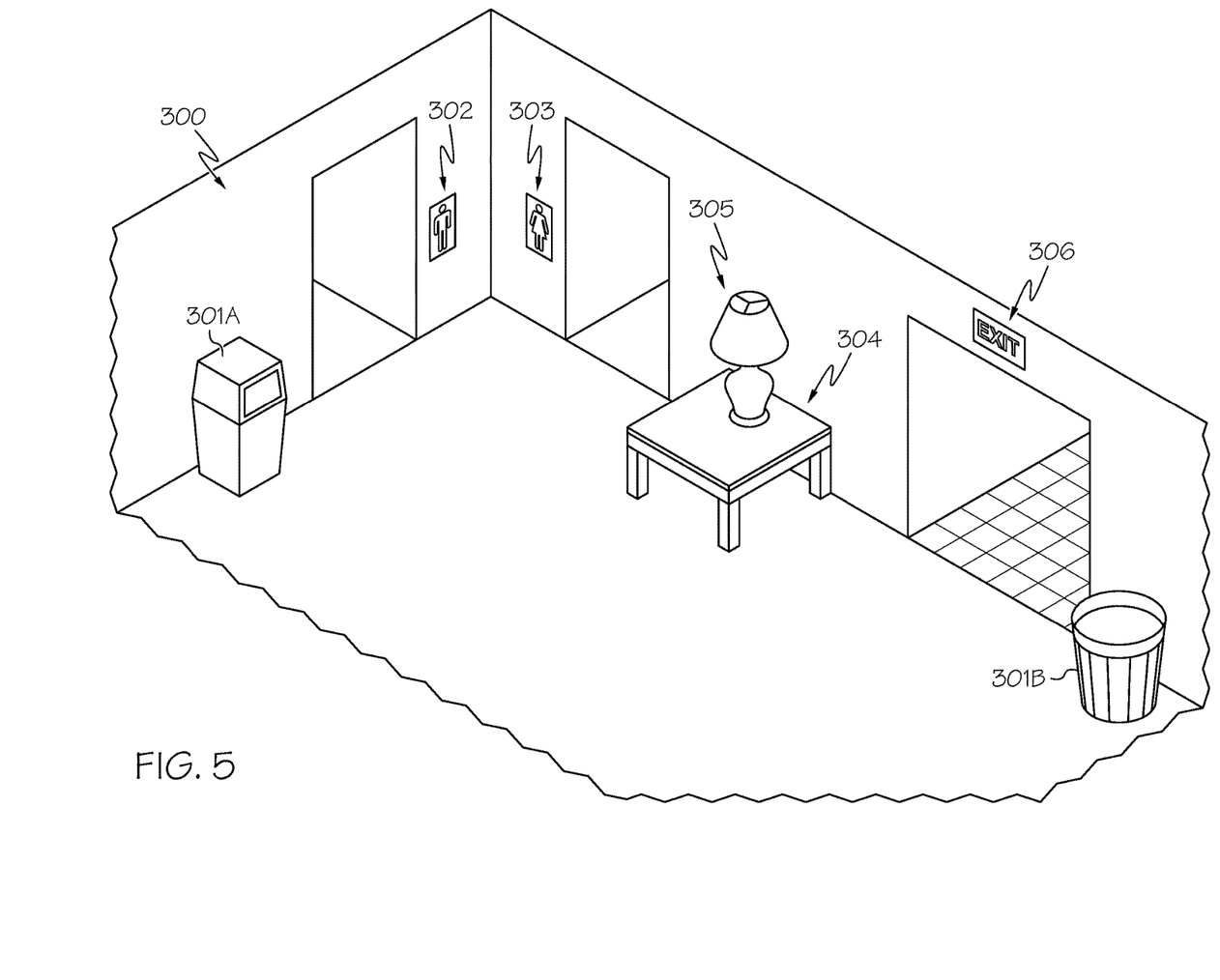
FIG. 5 schematically depicts an example environment in which a user may navigate.

Operation of a vision-assist device 100 will now be described. FIG. 5 depicts an example scene or environment 300 in which the user may navigate. For example, the environment 300 may be a retail store. Several objects and features are present within the illustrated environment 300, such as a first trashcan 301A, a second trashcan 301B, a men's restroom as indicated by a men's restroom sign 302, a women's restroom as indicated by a woman's restroom sign 303, a table 304, a lamp 305, and an exit as indicated by an exit sign 306. As the user navigates the environment 300, the vision-assist device 100 captures image data and detects objects within the environment.

Figure 6:
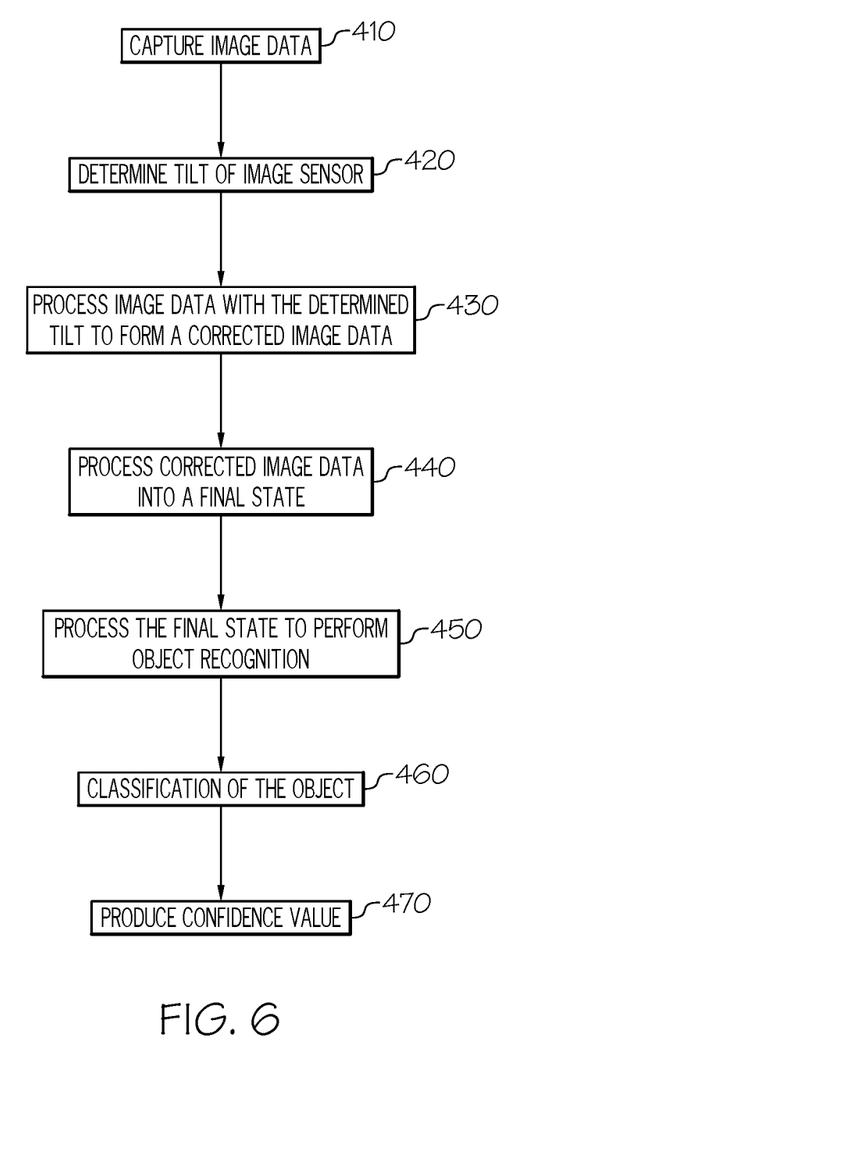
FIG. 6 graphically depicts an example process of detecting objects within an environment by detecting the tilt of an image sensor and processing the image data along with the detected tilt.
Figure 7:
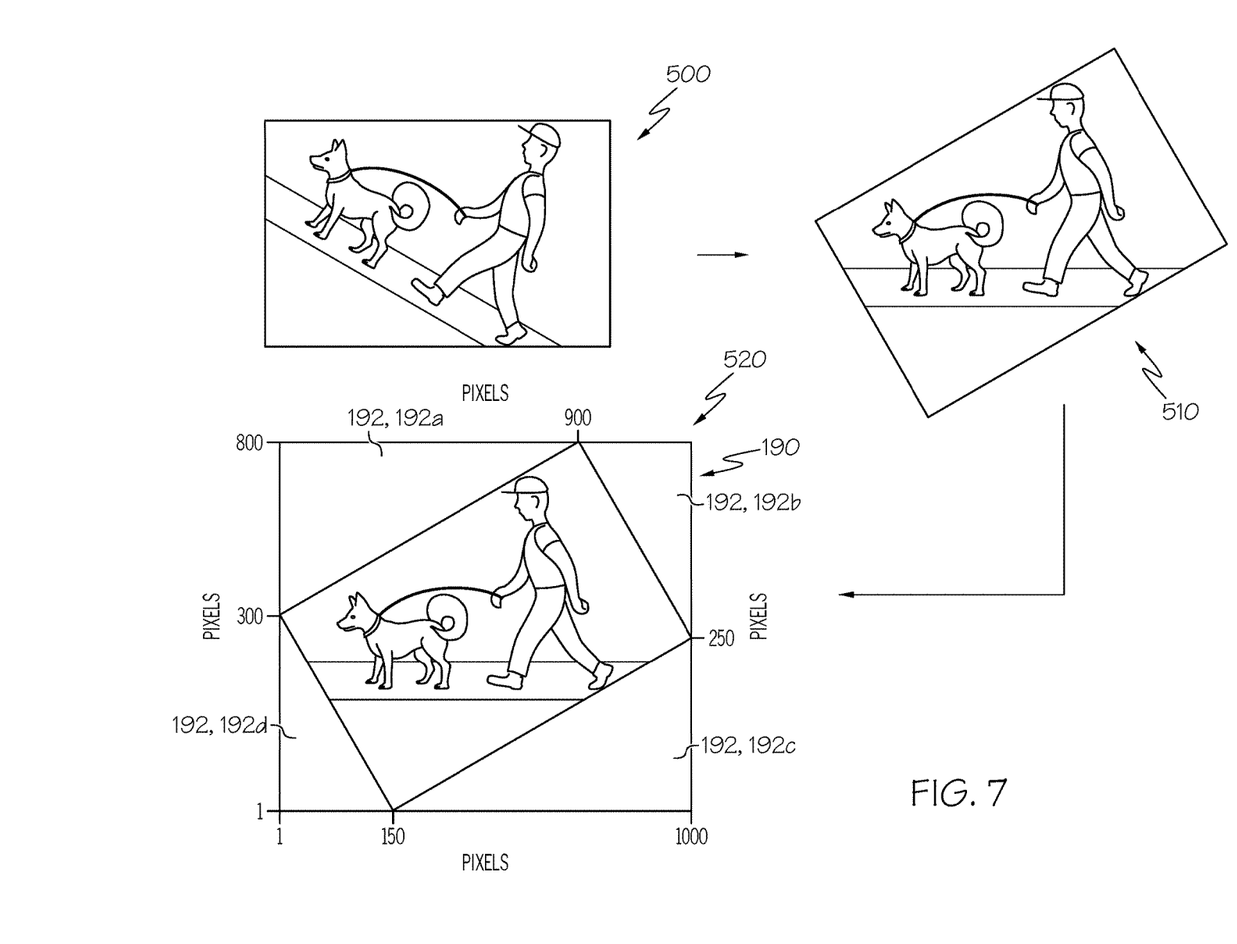
FIG. 7 graphically depicts an example process of detecting the tilt of the image sensor and processing the image data by correcting the orientation of the image data.

FIG. 6 depicts an example process of detecting objects within an environment, such as the environment 300 shown in FIG. 5, for example. As the user navigates the environment 300, the vision-assist device 100 captures image data at block 410 using the one or more image sensors 130. The image data may be in the form of one or more static digital images, or a video made up of many sequential digital images. The image data may be stored in the memory component 140. Referring briefly to FIG. 7, a schematic diagram showing the process of converting a tilted image data into a final state is provided. An image 500 depicts an image data in the form of a digital photograph taken by a tilted image sensor 130. For illustrative purposes, the image data is taken at an angle, as indicated by the downward grade of the floor. Thus, image 500 depicts a situation where the image sensor is tilted downwardly at an angle α with respect to an axis (e.g., a horizontal axis). Such an instance may occur if the vision-assist device 100 is not worn properly by the user and the image sensor 130 is not properly oriented with respect to the environment. Improper positioning of the vision-assist device 100 and the image sensor 130 may be as a result of the user not wearing the vision-assist 100 properly, the user coming to a sudden stop, the user being bumped into, and/or differences of the user's body type, as non-limiting examples.

Referring again to FIG. 6, previously, concurrently or subsequently to capturing image data, at block 420, the inertia measuring unit 150 detects the forces experienced by the image sensor 130 and the orientation of the image sensor 130. The inertia measuring unit 150 may create one or more signals with respect to the forces and/or orientation of the image sensor 130 of the vision-assist device 100.

The processor 120 is configured to receive the one or more signals from the inertia measuring unit 130. The processor 120 processes the signals regarding the forces and the orientation so as to determine a tilt of the image sensor. In one embodiment, the processor 120 may be configured to process the forces and the magnetic field, to include the direction of the magnetic field to determine the tilt. The processor 120 may be programmed to calculate the tilt from the signals from the inertial measuring unit 150 using any known or later-developed algorithms.

At block 430, the processor 120 corrects the image data based on the calculated tilt so as to create a corrected image data, wherein the image data is oriented so as to be in a position that correlates with an image data captured by an image sensor that is not tilted.

For example, the processor 120 is further configured to process the image data with the determined tilt so as to tilt the image data in the opposite direction by the same magnitude so as to form a corrected image data 190. As a non-limiting example, assume image data is captured by an image sensor 130 that is tilted five (5) degrees in one direction. (See FIG. 7). The inertia measuring unit 150 detects the forces acting on the image sensor 130 and the orientation of the image sensor 130. The processors 120 processes data collected by the image sensor 130 so as to calculate the five (5) degree tilt and the direction of the tilt. The processor 130 then repositions the image data by five degrees in the opposite direction so as to form the corrected image data 190. Image 510 of FIG. 7 is an illustrative example of the corrected image data 190. In particular, the correct image data 190 depicts the floor of the environmental seen being coplanar with the horizon, indicating that the image data is now positioned in the same manner as image data of the same environment captured by an image sensor that is not tilted. Object detection is thus made more accurate as the corrected image data 190 is oriented in a position of image data taken when the image sensor 120 is not tilted.

At block 440, the processor 120 may convert the corrected image data into a final state, wherein the final state is a form suitable for image processing. As used herein, the final state 190 refers to a form of the corrected image data suitable for image processing.

In one embodiment, the final state is created by adding blank image data to the edges of the corrected image data so as to create a rectangular digital photograph as represented by the corrected image data. Referring to FIG. 7, in one embodiment, the final state 520 is a photograph defined by image data having a rectangular shape. Thus, the processor 120 adds blank image data 192 to the edges of the corrected image data so as to form a rectangular shaped image data. For illustrative purposes, the final state 520 is shown as image data having a width "W" of 1000 pixels, and a height "H" of 800 pixels. The processor 120 adds a first blank image data 192a along a top edge of the corrected image data 190, a second blank image data 192b along a first side edge of the image data 190, a third blank image data 192c along a bottom edge of the image data 190 and a fourth blank image data 192d along a second side edge of the image data 190.

As a non-limiting example, the first blank image data 192a has a height of 500 pixels and a width of 900 pixels. The second blank image data 192b has a height of 550 pixels and a width of 100 pixels. The third blank image data 192c has a height of 250 pixels and a width of 850 pixels. The fourth blank image data 192d has a height of 300 pixels and a width of 150 pixels. Though the blank image data 192 is shown as being white, it should be appreciated that the blank image data may be colored differently. The blank image data 192 is image data which contains no discernable information such as varying edge density, corners, blobs and any other features used by object detection algorithms.

At block 450, the processor 120 processes the final state for objection recognition, wherein object recognition logic performs one or more object recognition algorithms on the final state of the corrected image data. The object recognition logic detects one or more objects within the final state representing the scene. Any known or yet-to-be-developed object recognition algorithms may be utilized to detect objects within the image data representing the environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like. It should be understood that the phrase "object recognition algorithm" as used herein also includes facial recognition algorithms used to detect people present within image data.

At block 460, the classification of the object is determined as a result of the object recognition process. The classification represents the type of object that is detected. For example, the image data representing the environment 300 shown in FIG. 5 includes a trashcan 301A. The object recognition algorithm may therefore classify object 301A as a trashcan.

Object recognition algorithms are not one hundred percent accurate and may misclassify objects for a variety of reasons. Non-limiting reasons that objects may be classified incorrectly is low ambient light, errors in the image data, the pose of the object in the environment, similarity in shape between different types of objects, unfamiliarity with the object and the angle at which the image data is captured.

Because the image data is no longer tilted due to any factor (e.g., an improperly worn vision-assist device 100), the ability for the object recognition algorithm to properly detect and classify an object is improved.

In one embodiment, the object recognition algorithms of the present disclosure may produce a confidence value with respect to the objects that are detected from the image data (block 470). The confidence value represents a degree of confidence regarding whether or not the actual object in the physical environment is the type of object determined from the image data. The confidence value may range from a minimum value (i.e., lowest confidence) to a maximum value (i.e., highest confidence). Low confidence values are produced when the object recognition cannot determine the proper classification of the detected object with high confidence. Conversely, when the object recognition is sure of the classification of the detected object, it produces a high confidence value. In some embodiments, the confidence value is a percentage ranging from 0% as the minimum value to 100% as the maximum value. In other embodiments, the confidence value may not be in the form of a percentage, but rather a number on a predetermined scale (e.g., 0 to 1.0, or 0 to 20).

A user of the vision-assist device 100 should trust the information it provides. If the vision-assist device 100 repeatedly tells the user that objects are something different than the actual objects in the environment, then the user may not wish to use the vision-assist device 100. Embodiments of the present disclosure convert the confidence value produced by the object recognition algorithm(s) into an auditory message capable of being heard and understood by the blind or visually impaired user. The auditory message provides a degree of certainty as to whether or not the classification of the detected object is actually the type of object physically present in the environment. By providing the user with auditory information in such a qualifying manner, the user may decide whether or not to trust the environmental information, and may trust the information provided by the vision-assist device 100 as a whole and may continue to want to use it.

For instance, the processor 120 may generate an auditory signal that includes at least the classification of the detected object as well as a representation of the confidence value for the detected object. An auditory signal, as used herein, is a digital or analog signal produced by the processor (alone or in conjunction with additional circuits or integrated circuits) that is provided to the one or more auditory devices 160 and represents the auditory message that is emitted by the one or more auditory devices 160.

In one embodiment, the auditory signal produced by the processor 120 may be generated by any known or yet-tobe-developed computer speech synthesis processes. In some embodiments, the auditory signal produces an auditory message that is conversational in nature (i.e., in a complete sentence). For example, auditory signal provided to the auditory device 160 may state: "I am 40% sure that there is a trashcan in front of you." Accordingly, the auditory message includes both the classification of the object (e.g., "trashcan") and an auditory representation of the confidence value (e.g., "40% sure").

Other types of auditory messages produced by the auditory device 160 do not recite an actual percentage of confidence but rather qualifies the classification of the object detected by the vision-assist device 100 in other ways. As a non-limiting example, the auditory messages may qualify the classification by use of words and phrases such as "not sure," "I think," "pretty sure," "fairly certain," "positive," "absolutely sure," and the like. For example, the auditory message may state "I think that there is a trashcan in front of you but I am not sure" when the confidence value is very low, and "I am absolutely sure that there is a trashcan is in front of you" when the confidence value is very high. With this type of qualifying information, the user of the vision-assist device 100 may decide whether or not to trust the information, and may use it to determine how he or she may respond (e.g., disregard the information, get a closer look, etc.).

It should now be understood that embodiments described herein are directed to vision-assist devices for use by blind or visually impaired persons. The vision-assist devices described herein detect objects within the user's environment. The vision-assist devices determine the tilt of the image sensor and processes the tilt of the image sensor so as to correct the image data to form suitable for image processing so as to facilitate object recognition. Accordingly, the vision-assist devices help increase the accuracy of object detection programs by positioning image data taken at an angle in a corrected position.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vision-assist device comprising:
   an image sensor for generating an image data corresponding to a scene;
   a processor; and
   an inertia measuring unit, the inertia measuring unit configured to detect a force acting on the at least one image sensor and an orientation of the at least one image sensor, wherein the processor is further configured to:
   receive the image data from the at least one image sensor;
   process the force and orientation of the at least one image sensor so as to determine a tilt of the image sensor; and
   process the image data from based on at least the tilt of the at least one image sensor so as to generate a corrected image data, wherein the corrected image data does not include the tilt,
   wherein the processor is further programmed to perform object recognition on the image data to determine a classification of a detected object that is present within the scene, determine a confidence value with respect to the classification of the detected object, wherein the confidence value is based on a confidence that the classification of the detected object matches an actual classification of the detected object, and generate an auditory signal based on the confidence value, and
   wherein the vision-assist device is configured to be worn by a user.

2. The vision-assist device of claim 1, wherein the at least one image sensor is a camera.

3. The vision-assist device of claim 1, wherein the inertia measuring unit includes at least one of an accelerometer and/or a gyroscope.

4. The vision-assist device of claim 1, wherein the inertia measuring unit is further configured to detect a magnetic force acting on the at least one image sensor.

5. The vision-assist device of claim 4, wherein the inertia measuring unit further includes a magnetometer.

6. The vision-assist device of claim 5, wherein the processor is further configured process the corrected image data into a final state.

7. The vision-assist device of claim 6, wherein the final state includes a plurality of blank image data added to the corrected image data such that the corrected image defines rectangular image.

8. The vision-assist device of claim 1, further including an audio device for receiving the auditory signal from the processor and for producing an auditory message from the auditory signal, wherein the auditory message is indicative of the classification of the detected object and the confidence value.

9. The vision-assist device of claim 8, further comprising an eyeglass frame, wherein the image sensor is coupled to the eyeglass frame.

10. The vision-assist device of claim 9, further comprising an earpiece configured to be inserted in an ear of a user, wherein an audio device is disposed within the earpiece.

11. The vision-assist device of claim 1, further comprising a housing configured to be worn by a user.

12. The vision-assist device of claim 11, wherein the housing comprises a neck portion, a first chest portion, and a second chest portion.

13. The vision-assist device of claim 12, wherein the image sensor is disposed within at least one of the first chest portion and the second chest portion.

14. A method of calibrating a vision-assist device, the vision-assist device comprising an image sensor, a processor, and an inertia measuring unit, the method comprising the steps of:
   generating, using the image sensor, image data corresponding to a scene;
   receiving, by the processor, the image data from the at least one image sensor;
   detecting, using the inertia measurement unit, a force and orientation of the image sensor and generating at least one signal corresponding to the force and orientation of the image sensor;
   processing, using the processor, the force and orientation of the image sensor of the at least one signal to determine a tilt of image sensor; and
   processing, using the processor, the image data to remove the tilt from the image data so as to generate a corrected image data that does not include the tilt,
   wherein the processor is further programmed to perform object recognition on the image data to determine a classification of a detected object that is present within the scene, determine a confidence value with respect to the classification of the detected object, wherein the confidence value is based on a confidence that the classification of the detected object matches an actual classification of the detected object, and generate an auditory signal based on the confidence value, and wherein the vision-assist device is configured to be worn by a user.

15. The method of claim 14, further including the steps of processing the corrected image data so as to perform object recognition.

16. The method of claim 15, wherein the image sensor is a camera.

17. The method of claim 16, wherein the inertia measuring unit is further configured to detect a magnetic force acting on the image sensor.

18. The method of claim 17, wherein the inertia measuring unit includes at least one of an accelerometer, a magnetometer and/or a gyroscope.

* * * * *